(12) United States Patent
Alnafisah

(10) Patent No.: US 10,093,416 B2
(45) Date of Patent: Oct. 9, 2018

(54) MULTIROTOR DRONE WITH VARIABLE CENTER OF LIFT

(71) Applicant: Khalid Hamad Mutleb Alnafisah, East Stroudsburg, PA (US)

(72) Inventor: Khalid Hamad Mutleb Alnafisah, East Stroudsburg, PA (US)

( * ) Notice: Subject to any disclaimer, the term of this patent is extended or adjusted under 35 U.S.C. 154(b) by 586 days.

(21) Appl. No.: 14/718,999

(22) Filed: May 21, 2015

(65) Prior Publication Data

US 2016/0376014 A1    Dec. 29, 2016

(51) Int. Cl.
*B64C 29/00*    (2006.01)
*B64C 39/02*    (2006.01)

(52) U.S. Cl.
CPC ...... *B64C 39/024* (2013.01); *B64C 2201/027* (2013.01); *B64C 2201/042* (2013.01); *B64C 2201/128* (2013.01)

(58) Field of Classification Search
CPC ........ B64C 2201/165; B64C 2201/128; B64B 1/24–1/38
See application file for complete search history.

(56) References Cited

U.S. PATENT DOCUMENTS

| 5,971,320 | A | * | 10/1999 | Jermyn | B64C 27/16 244/17.23 |
| 6,077,041 | A | * | 6/2000 | Carter, Jr. | B64D 35/00 244/17.19 |
| 8,162,262 | B2 | | 4/2012 | Kutzmann et al. | |
| 8,376,264 | B1 | | 2/2013 | Hong et al. | |
| 9,527,588 | B1 | * | 12/2016 | Rollefstad | B64C 39/024 |
| 2008/0230656 | A1 | | 9/2008 | Kretchmer | |
| 2014/0032034 | A1 | | 1/2014 | Raptopoulos et al. | |
| 2016/0272310 | A1 | * | 9/2016 | Chan | B64C 27/08 |

FOREIGN PATENT DOCUMENTS

| DE | 10 2012 112 489 A1 | 6/2014 |
| KR | 10-2012-0102880 | 9/2012 |

OTHER PUBLICATIONS

Dupuis et al., "Design Optimization of a Quad-Rotor Capable of Autonomous Flight", Apr. 24, 2008.

* cited by examiner

*Primary Examiner* — Jessica B Wong
(74) *Attorney, Agent, or Firm* — Oblon, McClelland, Maier & Neustadt, L.L.P.

(57) ABSTRACT

A system and method for efficiently maneuvering a multirotor drone having a control system, an electrical power source, a plurality of rotor assemblies each having a rotor boom, a rotor mast, at least one rotor blade, a rotor assembly adjustment apparatus, a plurality of electric motors, wherein each electric motor is connected to a rotor boom positioned in a substantially horizontal direction and drives a rotor mast positioned in a substantially vertical direction and connected to at least one rotor blade, with the position of said rotor boom automatically adjustable in a substantially horizontal direction by the adjustment apparatus and the control system.

10 Claims, 9 Drawing Sheets

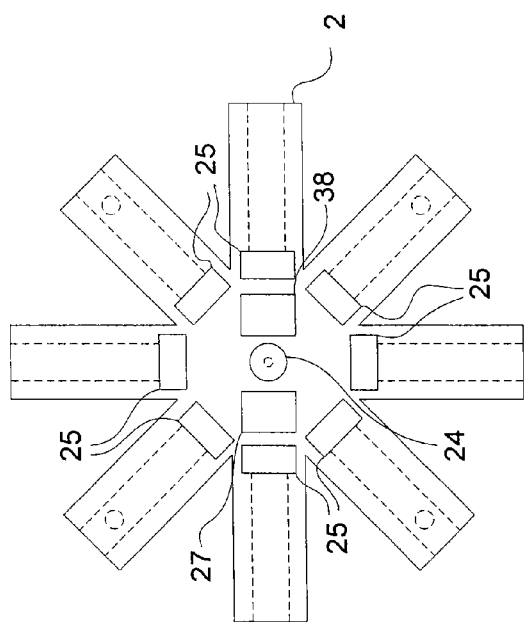
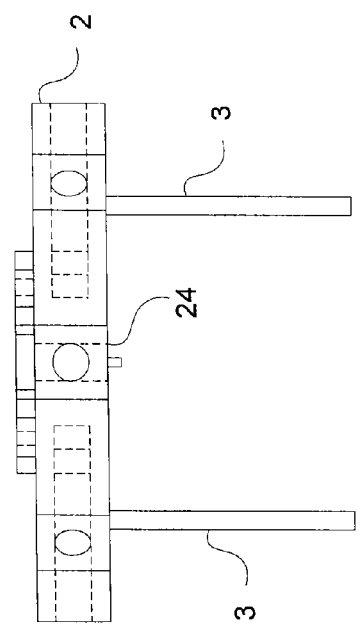
Fig. 2A
Fig. 2B

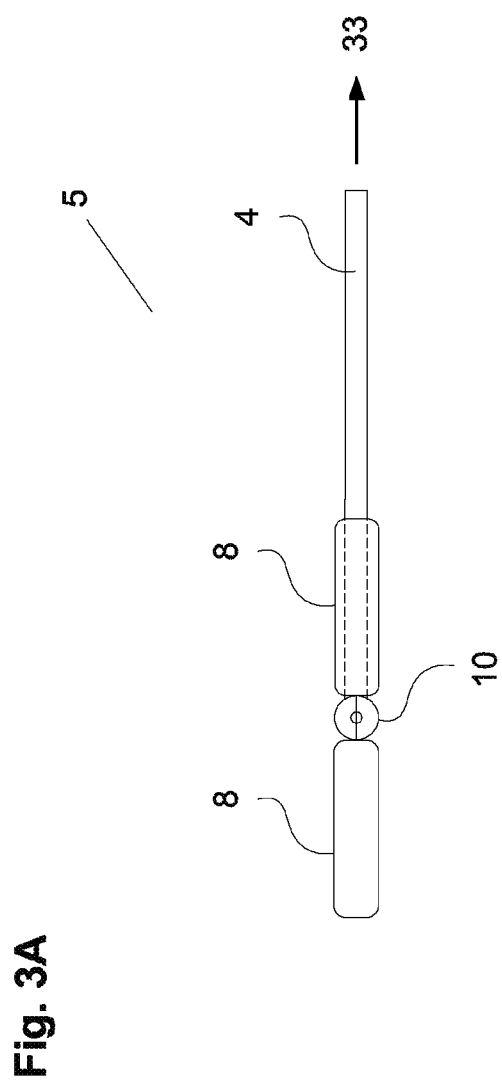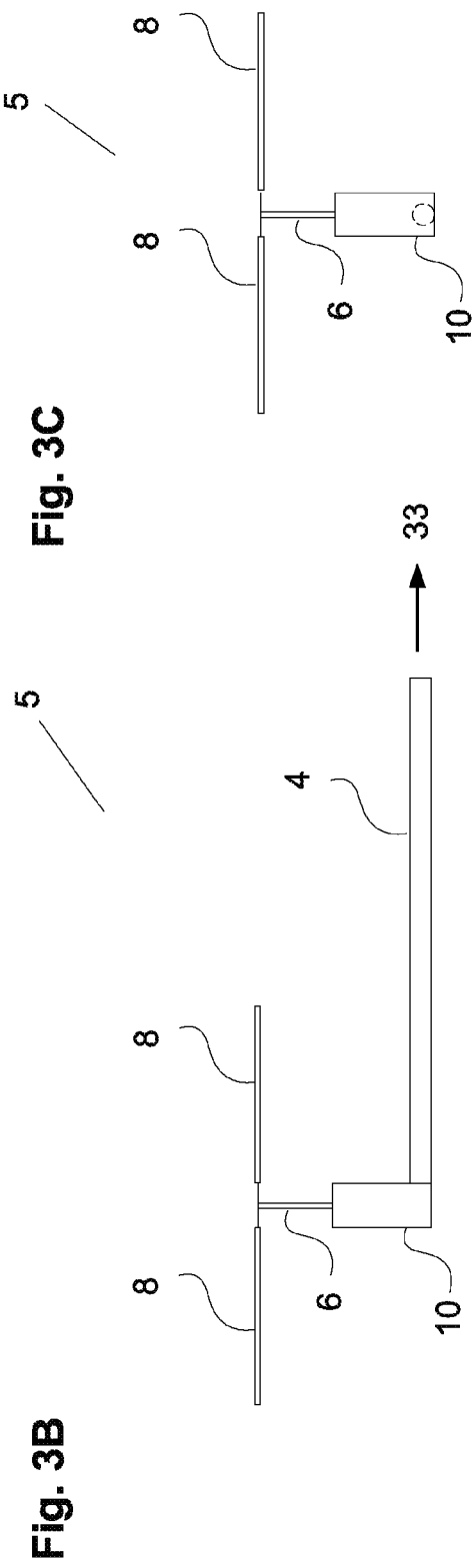

ary draw to scale unless
MULTIROTOR DRONE WITH VARIABLE CENTER OF LIFT

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Field of the Disclosure

The present disclosure is directed toward a multirotor drone with a variable center of lift and variable center of mass for dynamic stability over a range of operating conditions.

Description of the Related Art

Autonomous or remotely controlled multirotor drone aircraft with vertical takeoff and landing (VTOL) abilities have become more widely available. These craft are available in various sizes and have many uses including military and surveillance applications, aerial photography and videography, mapping, and package delivery. They take off and fly much like helicopters, though generally without the aid of a tail rotor.

As drone use proliferates and the range of applications expand, a number of shortcomings in the state of the art have appeared, namely limited flight time between refueling or recharging, and dynamic maneuverability and stability, an acute problem for smaller drones operating in windy conditions.

SUMMARY

The present disclosure is directed toward a multirotor drone with a variable center of lift and variable center of mass for dynamic stability over a range of operating conditions.

Multirotor drone roll and pitch is controlled, for example, by having half the rotors turn one direction while the other half rotate the opposite direction to cancel out gyroscopic effects. Yaw is produced by increasing the relative rotational speed of a diagonal set of rotors with respect to the opposite pair of rotors, while roll and pitch are produced by increasing the relative rotational speed of adjacent rotors on one side of the drone. Increasing relative speed of rotors can also include reducing the rotational speed of other rotors, or some combination of rotational speed adjustment among a plurality of rotors. In general, the greater the angle a drone tilts toward the direction of travel, the faster it will fly.

The center of mass is the instantaneous position about which the resultant force of the mass of the drone acts, and changes with the drone's position, fuel use, and movement of any applicable payload. The center of lift is the resultant force of the instantaneous sum of the lift generated by all the rotors.

Payload and fuel load, for drones powered by a liquid fuel, can shift dynamically due to, for example, fuel use and movement of the payload in flight.

Further, the speed at which an engine or electric motor operates affects the flight time of the drone. For either propulsion type there is generally some finite amount of energy that is carried on-board. The ability to operate an engine or motor at or near its most efficient speed can extend flight time. Adjusting the length of one or more of the rotor booms, and therefore the torque created by the rotors' lift about the drone, in combination with altering motor and rotor speeds can enhance stability, maneuverability, and energy efficiency and flight time.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIGS. 2A and 2B are plan and side views, respectively, of a main frame.

FIGS. 3A, 3B, and 3C are plan, side, and front views, respectively, of a rotor assembly.

DETAILED DESCRIPTION OF THE EMBODIMENTS

Figure 1A:
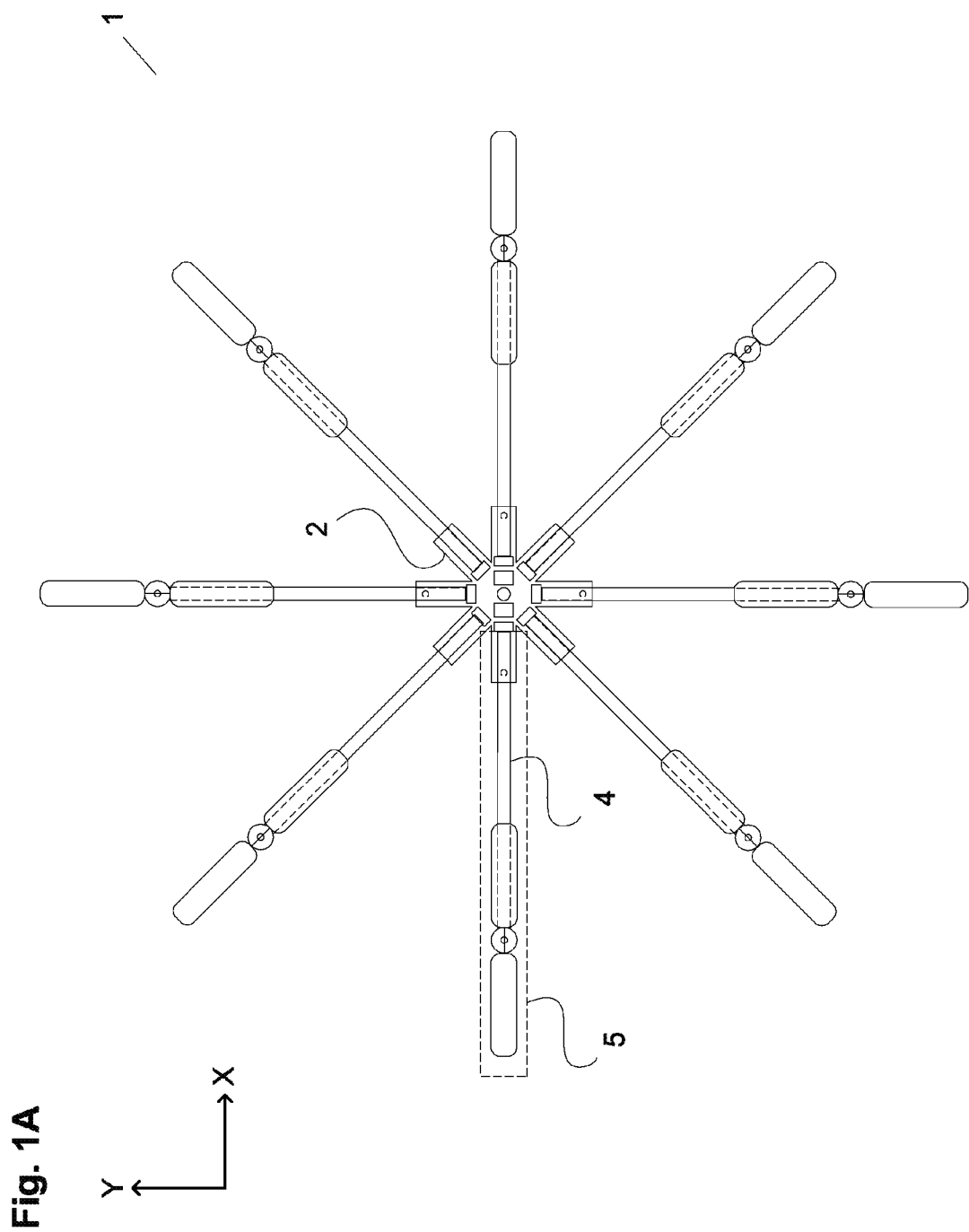
FIG. 1A is a plan view of a multirotor drone.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Referring now to the drawings, wherein like reference numerals designate identical or corresponding parts throughout the several views.

FIG. 1A is a plan view of an embodiment of a multirotor drone 1, a multirotor drone capable of vertical takeoff and landing (VTOL), and externally controlled by wireless communication or by autonomous function, and having multiple instances of a rotor assembly 5 arranged about the center of a main frame 2.

The position of each of the rotor assemblies 5 is adjustable along a horizontal axis in the X-Y plane relative to the main frame 2, shown with each in the fully retracted position and of equal length to all of the other rotor assemblies 5, the multirotor drone 1 generally possessing at least three rotor assemblies 5. In one embodiment there are eight, each with a rotor boom 4 having a single degree of freedom of motion.

Figure 1B:
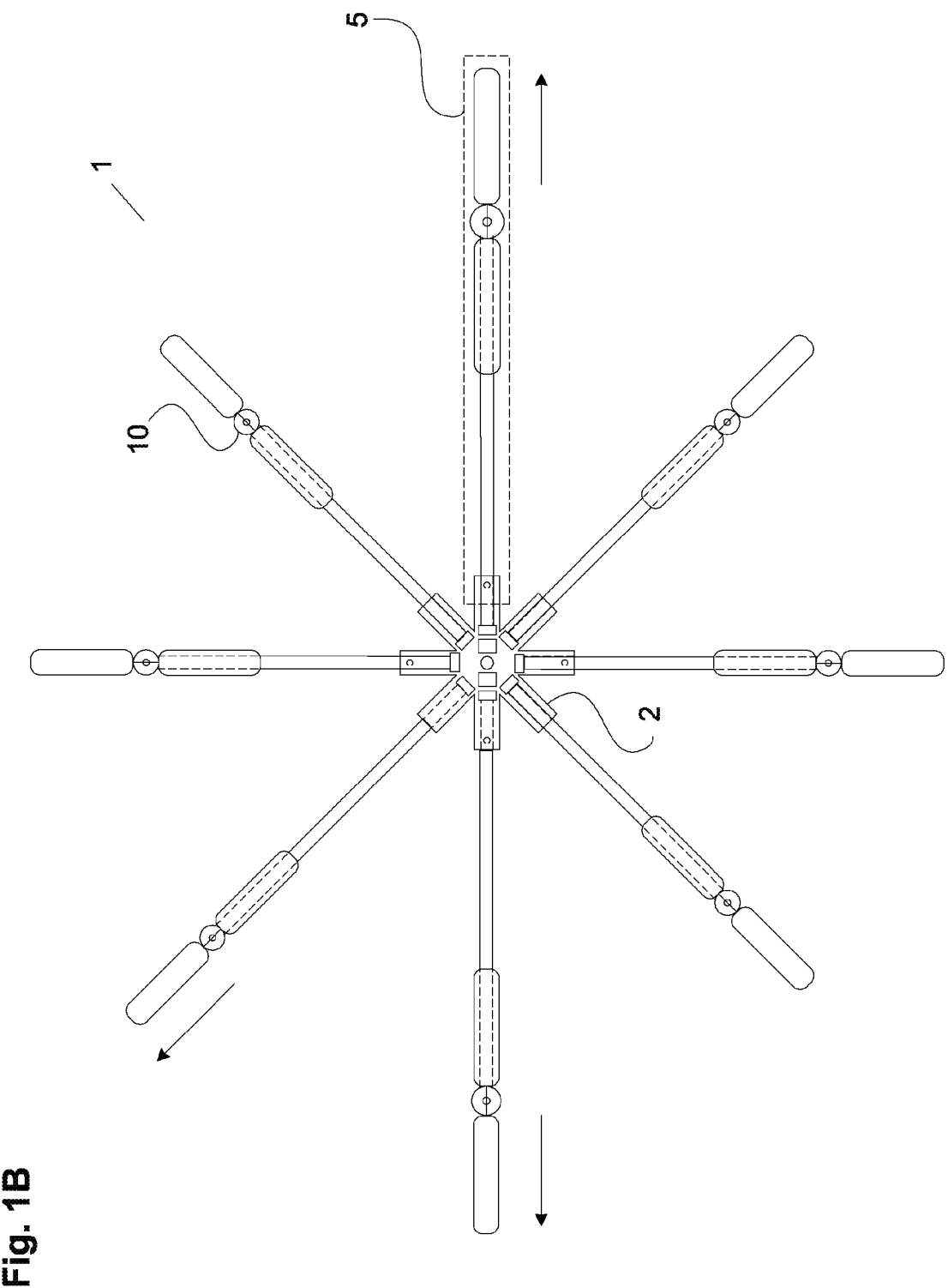
FIG. 1B is a plan view of a multirotor drone with some of the rotor assembly in the horizontally extended position.

FIG. 1B is a plan view of an embodiment of a multirotor drone 1 similar to that of FIG. 1A with some of the rotor assemblies 5 in the horizontally extended position. Any one or more of the rotor assemblies 5 can be extended some length between a fully retracted position and a fully extended position. The use of variable position rotor assemblies 5 provides adjustment of the distance between the electric motor 10, allowing for changes to the center of lift of the multirotor drone 1, center of lift defined as the resultant sum of the lift produced by each individual rotor assembly 5, which enhances stability when payload shifts or changes, and provides greater transient responsiveness compared to a case where the rotor assemblies 5 all remain in fixed positions for the duration of a flight.

Figure 1C:
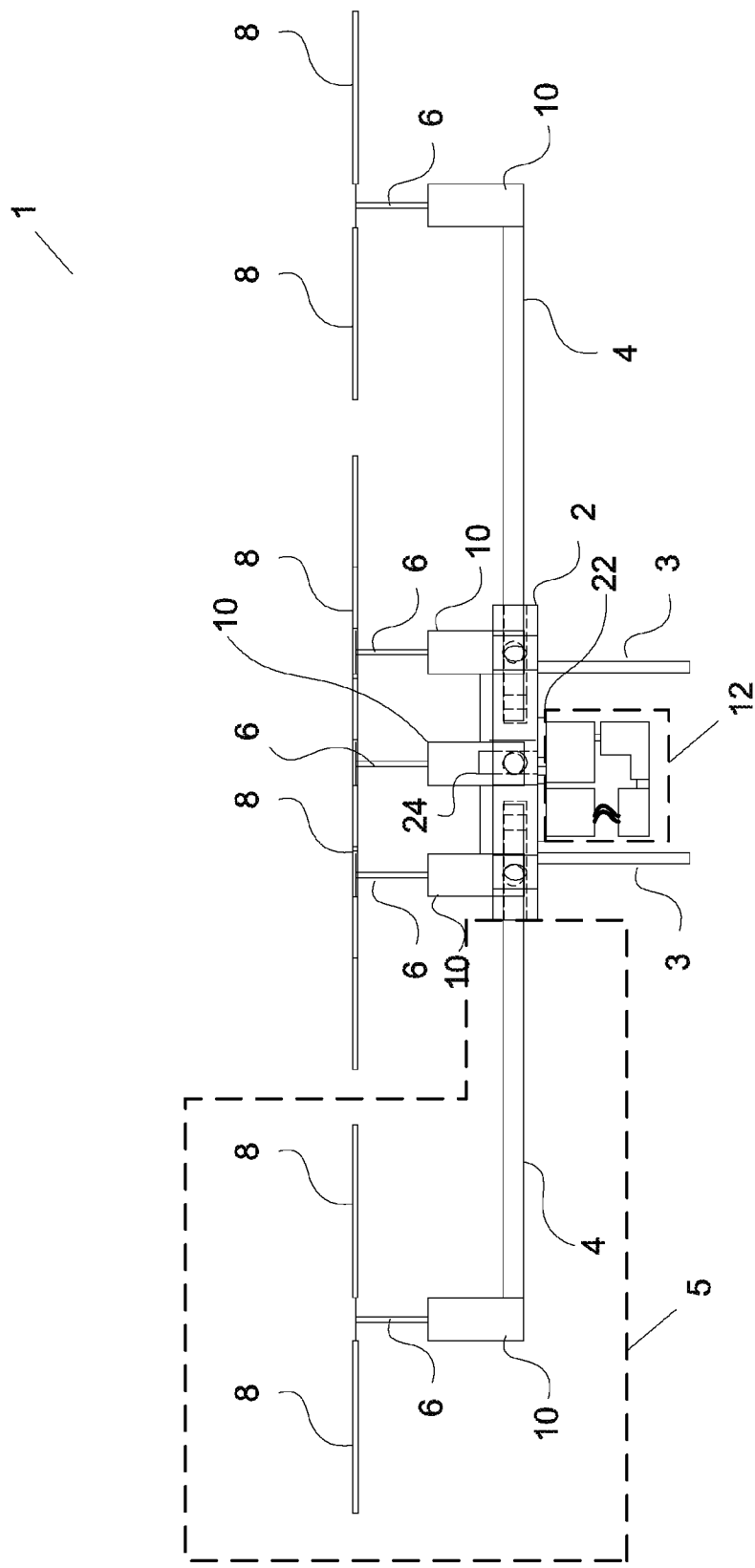
FIG. 1C is a side view of a multirotor drone.

FIG. 1C is a side view of an embodiment of a multirotor drone 1 having a main frame 2 connected to a plurality of landing gears 3, a power unit 12, a mounting plate 22, a servo motor 24, and a plurality of rotor assemblies 5, each having a rotor boom 4, a rotor mast 6, an electric motor 10, and rotor blades 8. In this embodiment the rotor assemblies 5 are shown in the fully retracted position. The landing gears 3 support the main frame 2 to which all other components are connected.

Each electric motor 10 operates at variable speeds to drive the rotor mast 6 which is connected to the pair of rotor blades 8 to generate lift. Each embodiment of this disclosure has at least one electric motor 10, and each rotor assembly 5 is connected to the main frame 2 by its rotor boom 4.

Other embodiments possess one piece or multi-piece assemblies of three or more rotor blade 8.

The power unit 12 is eccentrically connected to a mounting plate 22, which is connected to the main frame 2 and the servo motor 24. The horizontal position of the power unit 12 is adjusted by rotation of the mounting plate 22, which is controlled by movement of the servo motor 24, as described by FIGS. 4A and 4B.

Multirotor drones equipped with eight equally spaced rotors have a number of advantages over drones with fewer rotors, namely much greater payload capacity and the ability to operate with certain rotors deactivated, whether to conserve energy or due to failure of some of the rotors or motors. In addition to being dynamically balanced across two orthogonal horizontal axes, as is the case with a four rotor drone with rotors spaced 90 degrees apart, having an additional four equally spaced rotors provides the eight rotor drone with greater precision in yaw and roll control, for example if the additional rotors are positioned in between the 90 degree intervals, such as every 45 degrees.

However, multirotor drones with adjustable rotor booms do not necessarily need to have rotors equally spaced apart, and can function with varying combinations of rotor boom positions and speeds to achieve the desired resultant lift and thrust.

Further, an eight rotor drone can be formed by combining two drones, whether on the ground or in mid-flight, each having four rotors. With fixed rotor booms and rotor lengths an ideal arrangement for dynamic balance results from combining two four rotor drones at a 45 degree angle relative to each other in the plan view, the relationship of the rotor length to the boom length a key constraint for rotor clearance purposes.

With two substantially similar four rotor drones with telescoping rotor booms, there is additional flexibility as more space can be made available between the rotors for in-flight combination if one drone has its rotor booms fully extended while the second drone has its rotor booms fully retracted. Merging such drones can allow combining and sharing of energy stored aboard the drones, increasing payload capacity, extending flight time and providing redundancy.

FIGS. 2A and 2B are plan and side views, respectively, of an embodiment of an assembly having a main frame 2, a servo motor 24, a plurality of landing gears 3, a plurality of pneumatic circuits 25, an air supply system 27, and a control module 38.

Figure 6:
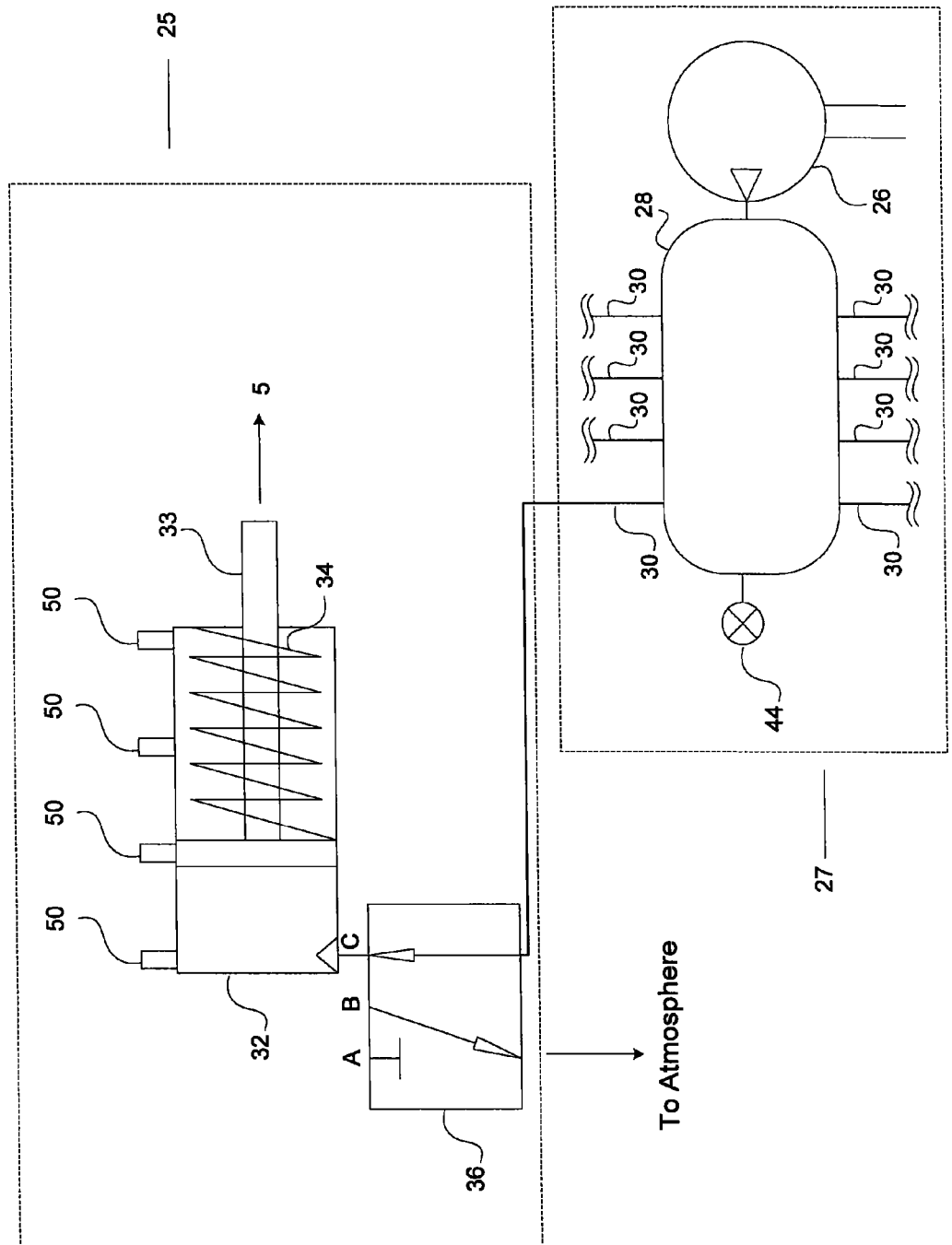
FIG. 6. is a diagram of a pneumatic circuit and air supply system.
Figure 7:
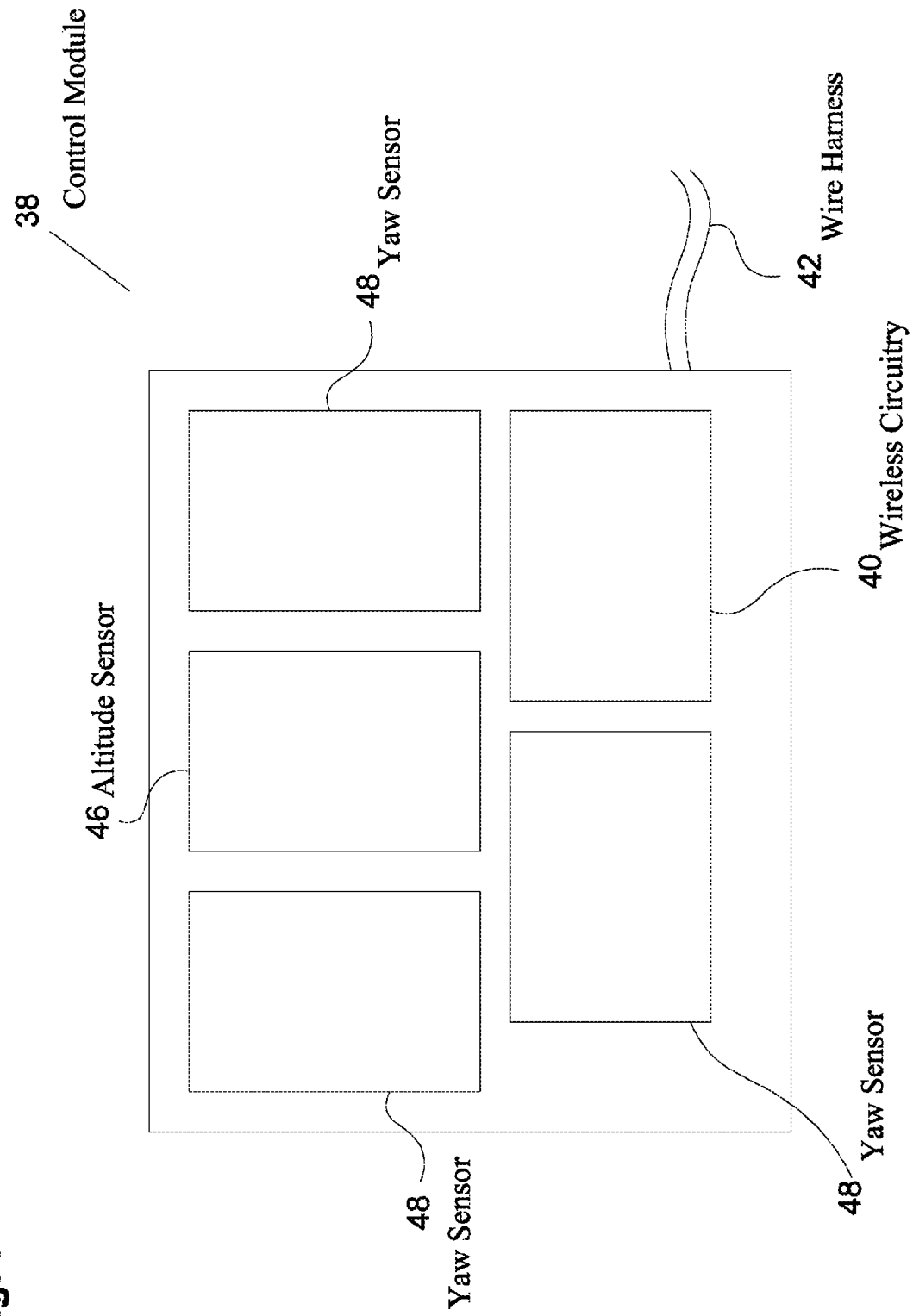
FIG. 7 is a diagram of a control module.

The main frame 2 serves as a mounting platform for the servo motor 24, the pneumatic circuit 25 (FIG. 6), the air supply system 27, and the control module 38 (FIG. 7).

In the embodiment shown the servo motor 24 is disposed inside of the main frame 2 and the mountings for each rotor assembly 5 are arranged symmetrically about the center of the main frame 2 in the plan view. Each mounting position for a rotor assembly 5 has one pneumatic circuit 25 positioned at the inboard end where the rod end of a piston 33 is connected to a rotor boom 4 (FIG. 3). The pneumatic circuit 25 controls the position of the rotor boom 4 relative to the main frame 2. As air pressure increases in the pneumatic circuit 25, its corresponding rotor boom 4 can extend radially from the center of main frame 2 (FIG. 2A), increasing the distance from the center of the electric motor 10 to the center of the servo motor 24 due to displacement of the piston 33 (FIG. 6) connected to the rotor boom 4.

As air pressure decreases in the pneumatic circuit 25, its corresponding rotor boom 4 can retract due to a return spring 34 (FIG. 6) overcoming the force of the pressure in the single acting cylinder 32.

The control module 38 controls all electronic functions of the multirotor drone 1, while the air supply system 27 provides pressurized air to an at least one pneumatic circuit 25, and each pneumatic circuit 25 controls horizontal movement of a rotor assembly 5 by its connection to a rotor boom 4. The main frame 2 is supported by a plurality of landing gear 3.

FIGS. 3A, 3B, and 3C are plan, side, and front views, respectively, of an embodiment of a rotor assembly 5 having a rotor boom 4, a rotor mast 6, an electric motor 10, and two rotor blades 8.

The electric motor 10 operates at variable speed, is controlled individually by the control module 38 (FIG. 7), turns a rotor mast 6 connected to at least one rotor blade 8, which produces upward lift centered about that electric motor 10 and the rotor blades 8.

The rotor boom 4 connects to the main frame 2 and a piston 33, and its position is controlled by the pneumatic circuit 25 (FIG. 2A). The piston 33 connects to the pneumatic circuit 25 at its opposite end away from the electric motor 10 (FIG. 2A).

Figure 4A:
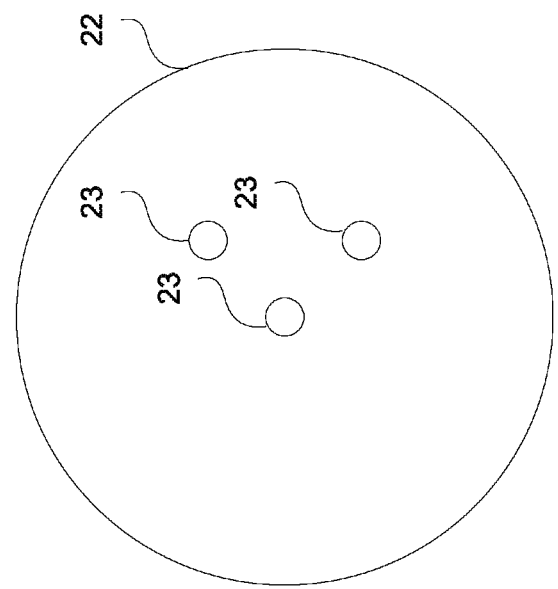
FIGS. 4A and 4B are plan and side views, respectively, of a mounting plate.
Figure 4B:
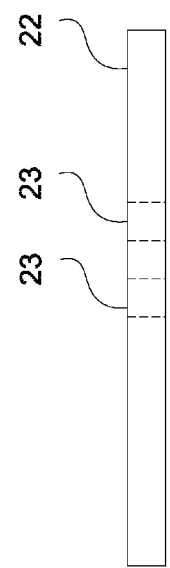

FIGS. 4A and 4B are plan and side views, respectively, of an embodiment of a mounting plate 22. The mounting plate 22 connects to the main frame 2, has a plurality of mounting holes 23 within for attachment to a power unit 12 (FIG. 5) and a servo motor 24 (FIG. 1C), and can be rotated about a mounting hole 23. The mounting hole 23 can be eccentric, allowing repositioning of the power unit 12 to move about both the X and Y axes simultaneously during rotation of the mounting plate 22. The position of the power unit 12 is adjustable in flight by the control module 38 (FIG. 7) through rotation of the mounting plate 22, which can simultaneously and independently vary with extension and retraction of any or all of the rotor assemblies 5, allowing flexible control of the center of mass for the case that dynamic conditions change asymmetrically, for example, as fuel load decreases or the payload and cargo shifts or changes, climatic conditions change, a rotor assembly 5 fails, speed changes of various electric motors 10, air speed changes, or to enhance stability and responsiveness during transient maneuvers.

In another embodiment a mounting plate 22 is equipped with at least one position sensor 21, and through which the control module 38 detects the position of the mounting plate 22 relative to the multirotor drone 1.

Figure 5:
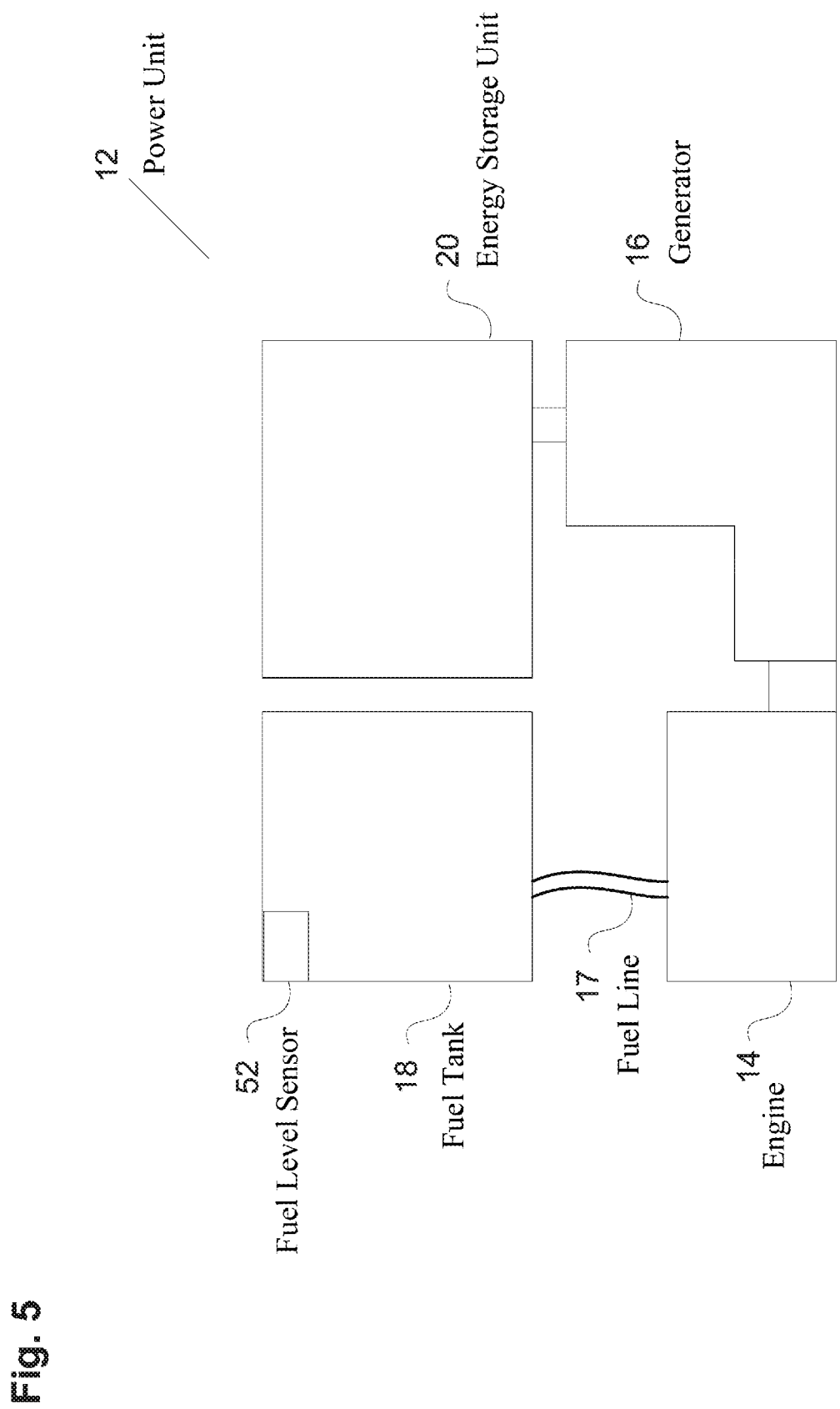
FIG. 5 is a diagram representing a hybrid power unit.

FIG. 5 is a diagram representing an embodiment of a hybrid power unit 12, the power unit 12 having an engine 14, a generator 16, a fuel line 17, a fuel tank 18, an energy storage unit 20, and a fuel level sensor 52.

In the embodiment shown, fuel from the fuel tank 18 is supplied to the engine 14 through the fuel line 17 by the force of gravity. The operation of the engine 14 drives the generator 16 to produce electricity. The engine 14 and the generator 16 convert relatively high energy density fuel sources, for example gasoline, into electricity for flexibility of use among the plurality of electric motors 10 and other electrical loads. The fuel tank 18 has a fuel level sensor 52 that provides data to the control module 38 (FIG. 7), for example, to monitor remaining available fuel, to calculate center of mass, and to calculate remaining range or flight time.

The generator 16 generates electricity and transmits it to the energy storage unit 20 for use as an energy buffer, providing constant electrical power to the various electric motors 10, the servo motor 24, the compressor 26, and the control module 38. The energy storage unit 20 is an energy storage unit, for example, including batteries, capacitors, mechanical flywheels, or any combination thereof.

The use of electrical energy allows for flexibility and simplicity in the powertrain, for example to quickly vary the speed of any of the electric motors 10, or to operate any number of the electric motors 10 at any time, and to maintain or quickly change the overall resultant center of lift of the multirotor drone 1. The connections involved are limited to a few wires per electric motor 10 rather than that which would be required if, for example, the rotor mast 6 were each operated by gasoline-powered engines, while the use of high energy density fuel extends flight time for a given mass.

The use of an integrated power unit 12 attached to a mounting plate 22 allows the power unit 12 to be quickly and easily replaced as a unit.

FIG. 6 is a diagram of an embodiment of a pneumatic circuit 25 and an air supply system 27. Each multirotor drone 1 can have at least one air supply system 27 and at least one pneumatic circuit 25, the air supply system 27 having a compressor 26, an air tank 28, a pressure sensor 44, and at least one air line 30. The air supply system 27 supplies pressurized air to the at least one pneumatic circuit 25. The compressor 26 takes in air, generally at atmospheric pressure, and compresses it into the air tank 28 for storage. The air tank 28 has a pressure sensor 44 to measure internal pressure with the ability to supply the data to a control module 38, and at least one air line 30 for supplying pressurized air to the at least one pneumatic circuit 25.

Each pneumatic circuit 25 has a control valve 36, a single acting cylinder 32, a piston 33, a return spring 34, and at least one linear position sensor 50. The control valve 36 is connected to the pressurized side of the single acting cylinder 32. The piston 33 is positioned within, and shares its longitudinal axis with the single acting cylinder 32. The return spring 34, disposed between the rod side of the piston 33 and an internal wall of the single acting cylinder 32, resists linear movement of the piston 33 such that when air pressure increases inside the pressurized side of the single acting cylinder 32, the return spring 34 is compressed by the piston 33. The rod end of the piston 33 is connected to a rotor assembly 5, at the inboard end of the rotor boom 4 opposite of the electric motor 10, and movement of the piston 33 is proportional to the horizontal movement of the rotor assembly 5 it is connected to.

The control valve 36 has three distinct positions. In position A it is closed such that air cannot enter nor exit the single acting cylinder 32, and maintains a substantially constant internal pressure within the single acting cylinder 32, and thus maintains the horizontal position of the rotor assembly 5 to which it is connected.

In position B, air from inside the single acting cylinder 32 is allowed to escape out to the atmosphere until the internal pressure of single acting cylinder 32 reaches equilibrium. The force of the return spring 34 pushes the piston 33, and the rotor assembly 5 to which it is connected, to retract horizontally as air pressure is reduced in the single acting cylinder 32.

In position C pressurized air from the air tank 28 flows through the air line 30 and control valve 36, and into the single acting cylinder 32, increasing pressure on the piston 33, compressing the return spring 34, and extending the effective length of the rotor assembly 5 as the piston 33 moves.

The purpose of the single acting cylinder 32 is to effect the horizontal movement of the rotor assembly 5. A plurality of linear position sensors 50 are positioned along the body of the single acting cylinder 32 to monitor the position of the piston 33, and to relay those readings to the control module 38 (FIG. 7).

In another embodiment the multirotor drone 1 has one pneumatic circuit 25 for all of the rotor assembly 5. Any horizontal movement of the rotor assembly 5 is equal and simultaneous.

In another embodiment the multirotor drone 1 has one pneumatic circuit 25 for each pair of opposite rotor assembly 5. Any horizontal movement of a corresponding pair of rotor assembly 5 is equal and simultaneous.

In another embodiment the multirotor drone 1 has one pneumatic circuit 25 for each rotor assembly 5. Horizontal movement of each rotor assembly 5 is independent of that of any other rotor assembly 5.

FIG. 7 is a diagram of an embodiment of a control module 38 having a wireless circuitry 40, an altitude sensor 46, a plurality of yaw sensors 48, and a wire harness 42. The wireless circuitry 40 is circuitry for communicating wirelessly with external devices, including circuitry to send and receive signals and data, for example through smart phones and other wireless devices, using a variety of communication protocols, such as Radio Frequency (RF), satellite, or cellular.

The wire harness 42 electrically connects the various systems, assemblies, components, and power sources of the multirotor drone 1, for example the electric motors 10, the generator 16, the energy storage unit 20, the servo motor 24, the compressor 26, the control valves 36, the pressure sensor 44, the yaw sensors 48, the linear position sensors 50, and the fuel level sensor 52.

The altitude sensor 46 measures the altitude of the multirotor drone 1. Each yaw sensor 48 measures rotation about a particular axis of the multirotor drone 1. A control module 38 having three yaw sensors 48 allows for simultaneous measurement of, for example, yaw, pitch, and roll of the multirotor drone 1 about multiple axes.

In this embodiment the control module 38 controls all functions of and is connected to the multirotor drone 1 at the main frame 2.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A multirotor drone comprising:
a control system;
a mounting plate;
a power unit detachably connected to the mounting plate;
a servo motor connected to the mounting plate, the servo motor being configured to communicate, in response to a change in at least one of fuel level, payload, equipment failure and environmental conditions, with the control system to adjust a location of the center of mass of the multirotor drone by rotating the mounting plate;
a plurality of rotor assemblies each comprising a rotor boom, a rotor mast, and at least one rotor blade;
a rotor assembly adjustment apparatus; and
a plurality of electric motors powered by the power unit and controlled by the control system; wherein
each electric motor is connected to a corresponding rotor boom of one of the plurality of rotor assemblies, each electric motor is disposed in a substantially vertical direction relative to each rotor boom and drives a corresponding rotor mast of one of the plurality of rotor assemblies, the rotor mast being disposed in the substantially vertical direction relative to the rotor boom and being connected to at least one rotor blade of the corresponding one of the plurality of rotor assemblies,
wherein a position of said rotor boom is automatically adjustable in a substantially horizontal direction perpendicular to the vertical direction by the rotor assembly adjustment apparatus and the control system in conjunction with the adjustment of the location of the center of mass of the multirotor drone by rotating the mounting plate,
wherein the mounting plate includes a plurality of mounting holes, where at least one mounting hole is offset from a center of the mounting plate; and
wherein the mounting plate is mounted to a main frame of the drone via the offset mounting hole whereby the mounting plate rotates about the offset mounting hole, and
the power unit is detachably attached to the mounting plate via one of the mounting holes.

2. The multirotor drone according to claim 1, further comprising:
an air tank having an air compressor, and
a plurality of air lines;
a plurality of air supply systems each configured to adjust respective positions of respective rotor booms, and including;
a control valve connected to a respective airline; and
an acting cylinder connected to the control valve and comprising a piston and a return spring; wherein
the air compressor fills the air tank with pressurized air, and the control valve directs pressurized air into the acting cylinder to push the rotor boom against the return spring.

3. The multirotor drone according to claim 2 wherein:
each control valve simultaneously directs pressurized air into and out of at least one single acting cylinder connected to an opposing pair of adjustable rotor booms that move proportionally to each other.

4. The multirotor drone according to claim 2 wherein:
each control valve simultaneously directs pressurized air into and out of at least one single acting cylinder connected to at least two adjacent adjustable rotor booms that move proportionally to each other.

5. The multirotor drone according to claim 2 wherein:
each control valve simultaneously directs pressurized air into and out of at least one single acting cylinder connected to two opposing pairs of adjustable rotor booms that move proportionally to each other.

6. The multirotor drone according to claim 5 wherein:
said opposing pairs of adjustable rotor booms are disposed in a substantially orthogonal direction relative to one another.

7. The multirotor drone according to claim 1, further comprising:
a position sensor; wherein
the control system communicates with the position sensor, which is connected to the mounting plate, and detects the relative position of the mounting plate, and
the servo motor adjusts the location of the center of mass of the multirotor drone by rotation of the mounting plate based on the communication.

8. The multirotor drone according to claim 1, wherein:
said mounting plate rotates about a vertical axis of the offset mounting hole.

9. The multirotor drone according to claim 1, wherein:
said mounting plate moves in a path along one horizontal axis of the mounting plate.

10. The multirotor drone according to claim 1, wherein the plurality of mounting holes includes a mounting hole at the center of the mounting plate.

* * * * *